US008805154B2

(12) United States Patent
Lin et al.

(10) Patent No.: US 8,805,154 B2
(45) Date of Patent: Aug. 12, 2014

(54) ORGANIZING DEVICE FOR OPTICAL FIBER LINES

(71) Applicants: Gloriole Electroptic Technology Corp., Kaohsiung (TW); Shen Zhen Wonderwin Technology Co., Ltd., Shen Zhen (CN); Tasin Technology Co., Ltd., Guangdong (CN)

(72) Inventors: Jim Lin, Kaohsiung (TW); Danxu Wu, Guangdong (CN); Ming-Hua Chang, Kaohsiung (TW)

(73) Assignees: Gloriole Electroptic Technology Corp., Kaohsiung (TW); Shen Zhen Wonderwin Technology Co., Ltd., Shen Zhen (CN); Tasin Technology Co., Ltd., Guangdong (CN)

( * ) Notice: Subject to any disclaimer, the term of this patent is extended or adjusted under 35 U.S.C. 154(b) by 95 days.

(21) Appl. No.: 13/716,549

(22) Filed: Dec. 17, 2012

(65) Prior Publication Data

US 2014/0016906 A1    Jan. 16, 2014

(30) Foreign Application Priority Data

Jul. 13, 2012    (TW) .............................. 101125322 A (51) Int. Cl.
*G02B 6/44*    (2006.01)
*G02B 6/38*    (2006.01)

(52) U.S. Cl.
CPC ............ *G02B 6/4439* (2013.01); *G02B 6/3833* (2013.01); *G02B 6/3898* (2013.01); *G02B 6/3885* (2013.01)

USPC ........... 385/137; 385/135; 385/138; 385/139; 385/140

(58) Field of Classification Search
None
See application file for complete search history.

(56) References Cited

U.S. PATENT DOCUMENTS

| | | | | |
|---|---|---|---|---|
| 4,046,454 | A  * | 9/1977 | Pugh, III ......................... | 385/59 |
| 4,962,989 | A  * | 10/1990 | Jung et al. ..................... | 385/135 |
| 6,516,498 | B2 * | 2/2003 | LaCoy et al. ................. | 24/16 R |
| 6,771,871 | B2 * | 8/2004 | Krampotich et al. ......... | 385/134 |
| 8,380,034 | B2 * | 2/2013 | Fleouter et al. ............... | 385/135 |
| 2003/0091316 | A1* | 5/2003 | Wu et al. ....................... | 385/137 |
| 2004/0118349 | A1* | 6/2004 | Endle et al. ................... | 118/728 |
| 2008/0098571 | A1* | 5/2008 | Morris .......................... | 24/16 R |
| 2008/0179469 | A1* | 7/2008 | Leone et al. .................... | 248/56 |
| 2014/0016906 | A1* | 1/2014 | Lin et al. ....................... | 385/135 |

* cited by examiner

*Primary Examiner* — Mark Robinson
*Assistant Examiner* — Andrew Jordan
(74) *Attorney, Agent, or Firm* — Dickstein Shapiro LLP (57) ABSTRACT

An organizing device is for organizing multiple optical fiber lines to run parallel to each other on a plane. The organizing device includes a guiding unit and a positioning unit. The positioning unit includes a main body slidably disposed on the guiding unit, a first positioning part extending from the main body, and a second positioning part that extends from the main body in a same direction as the first positioning part and that is spaced apart from the first positioning part. The main body, the first positioning part and the second positioning part cooperate to define a positioning slot. The distance between the first and second positioning parts corresponds to a diameter of the optical fiber lines.

10 Claims, 7 Drawing Sheets

ORGANIZING DEVICE FOR OPTICAL FIBER LINES

CROSS-REFERENCE TO RELATED APPLICATION

This application claims priority of Taiwanese application no. 101125322, filed on Jul. 13, 2012.

BACKGROUND OF THE INVENTION

1. Field of the Invention

The present invention relates to an organizing device for organizing multiple optical fiber lines to run parallel to each other on a plane.

2. Description of the Related Art

Figure 1:
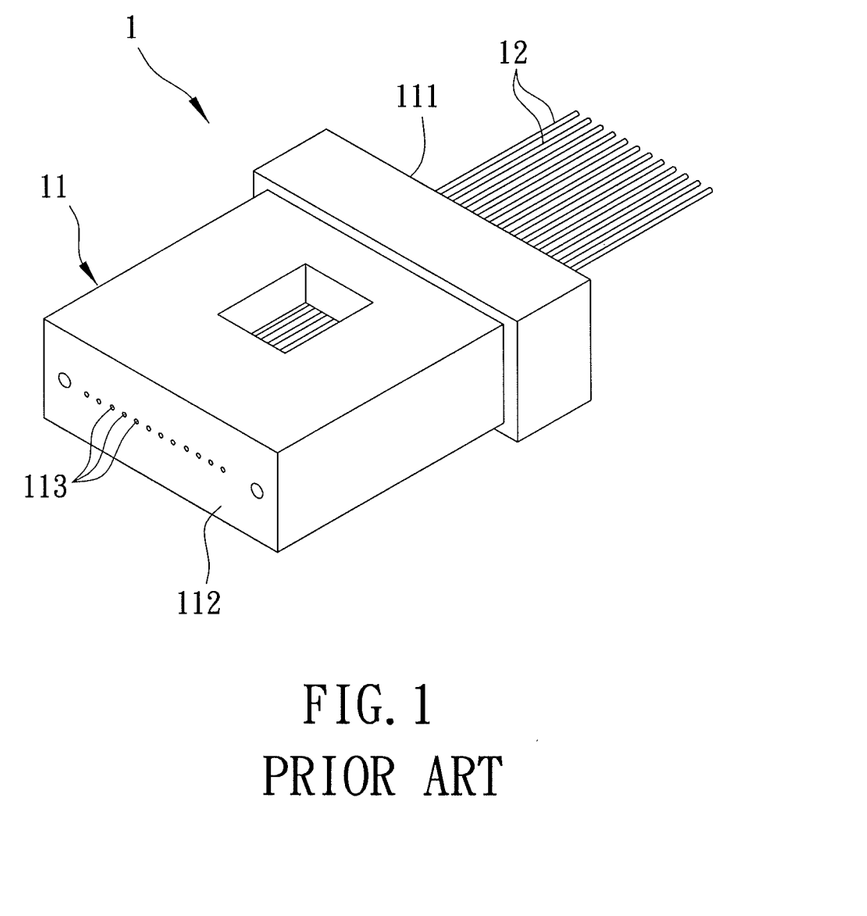
FIG. 1 is a perspective view of an optical connector according to the prior art.
Figure 2:
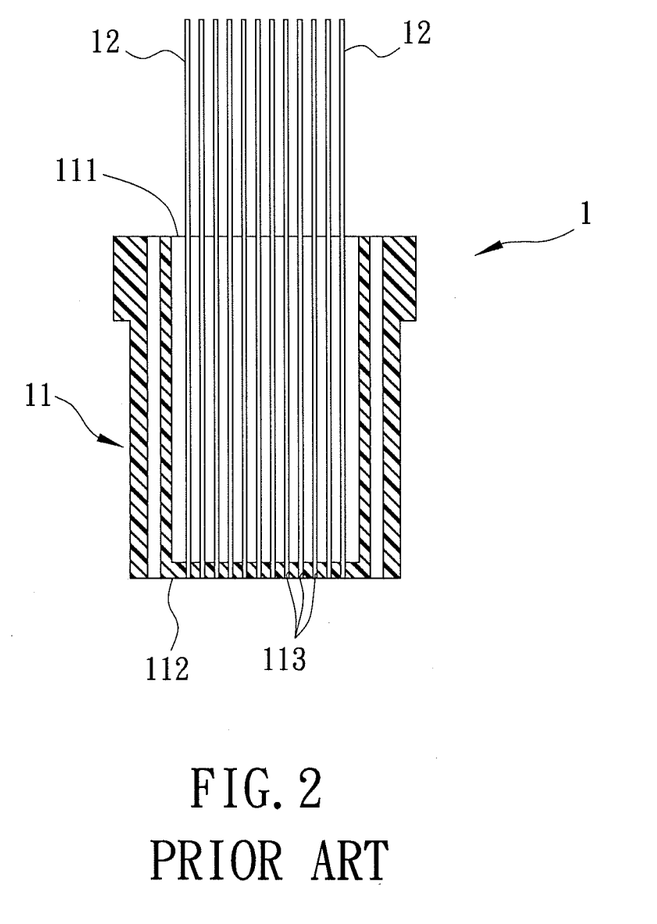
FIG. 2 is a cross sectional view of the optical connector in Figure. 1.

Referring to FIGS. 1 and 2, a conventional optical connector 1 includes a plug 11, and a plurality of optical fiber lines 12 inserted into the plug 11 in a predetermined arrangement. The plug 11 includes a first portion 111 for the optical fiber lines 12 to be inserted into, a second portion 112 connected to the first portion 111, and a plurality of holes 113 that are formed corresponding to the optical fiber lines 12 in the second portion 112.

During manufacturing, the operator has to, after arranging the optical fiber lines 12 according to their individual predetermined positions, manually insert the optical fiber lines 12 into the holes 113 of the second portion 112 through the first portion 111, with one hand holding onto the plug 11 and the other onto the optical fiber lines 12.

However, since the optical fiber lines 12 are soft and the diameter thereof is fairly small, handling of the optical fiber lines 12 is rather difficult. Applying too much force will bend and damage the optical fiber lines 12, whereas applying too little force will not allow one to effectively position the optical fiber lines 12 according to their individual predetermined positions in the optical connector 1.

SUMMARY OF THE INVENTION

The object of the present invention is to provide an organizing device for organizing multiple optical fiber lines to run parallel to each other on a plane without causing damage to the optical fiber lines.

According to the pre sent invention, there is provided an organizing device that comprises:

a guiding unit; and a positioning unit including a main body slidably disposed on the guiding unit, a first positioning part extending from the main body, and a second positioning part that extends from the main body in a same direction as the first positioning part, and that is spaced apart from the first positioning part;

the main body, the first positioning part and the second positioning part cooperating to define a positioning slot;

wherein a distance between the first and second positioning parts corresponds to a diameter of the optical fiber lines.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 3:
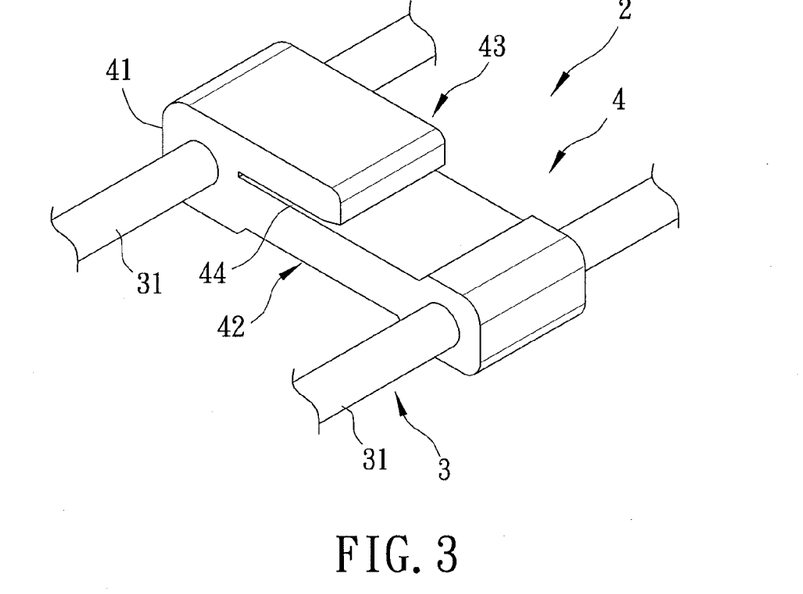
FIG. 3 is a perspective view of an organizing device according to the first preferred embodiment of the present invention.

Referring to FIG. 3, a first preferred embodiment of an organizing device 2 for organizing multiple optical fiber lines in the present invention includes a guiding unit 3, and a positioning unit 4 slidably disposed on the guiding unit 3. The guiding unit 3 includes two guide components 31. In this preferred embodiment, the two guide components 31 are two parallel guiding rods that are spaced apart from each other.

The positioning unit 4 includes a main body 41 slidably disposed on the guiding unit 3, a first positioning part 42 extending from the main body 41, and a second positioning part 43 that extends from the main body 41 in a same direction as the first positioning part 42 and that is spaced apart from the first positioning part 42. The positioning unit 4 further includes a positioning slot 44 cooperatively defined by the main body 41, the first positioning part 42 and the second positioning part 43.

In this preferred embodiment, each of the guide components 31 extends through a respective one of the main body 41 and the distal end of the first positioning part 42 that is opposite to the main body 41, enabling the positioning unit 4 to stably move along the guide components 31. In practice, it is also possible to stabilize the positioning unit 4 using only one guide component 31 extending through the main body 41.

Figure 4:
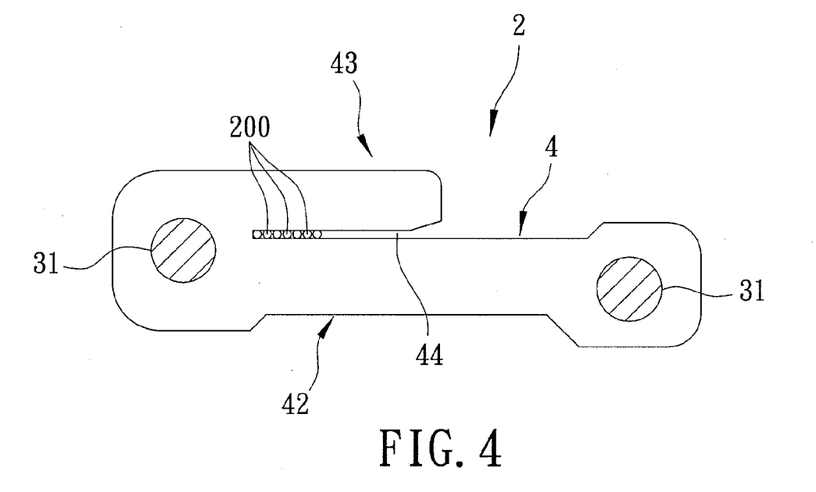
FIG. 4 is a cross sectional view of the organizing device in FIG. 3.

Referring to FIGS. 3 and 4, in an actual application, a plurality of the optical fiber lines 200 can, according to their individual predetermined positions, be arranged in the positioning slot 44, and be firmly retained between the first positioning part 42 and the second positioning part 43.

Since the a distance between the positioning parts 42, 43 corresponds to a diameter of the optical fiber lines 200, the optical fiber lines 200 can be efficiently placed into the positioning slot 44 according to their individual predetermined positions. This helps to prevent damage to the optical fiber lines 200 inside the positioning slot 44 by external forces and misplacement of the optical fiber lines 200 from their individual predetermined positions due to lack of strength applied by an operator during assembly.

Figure 5:
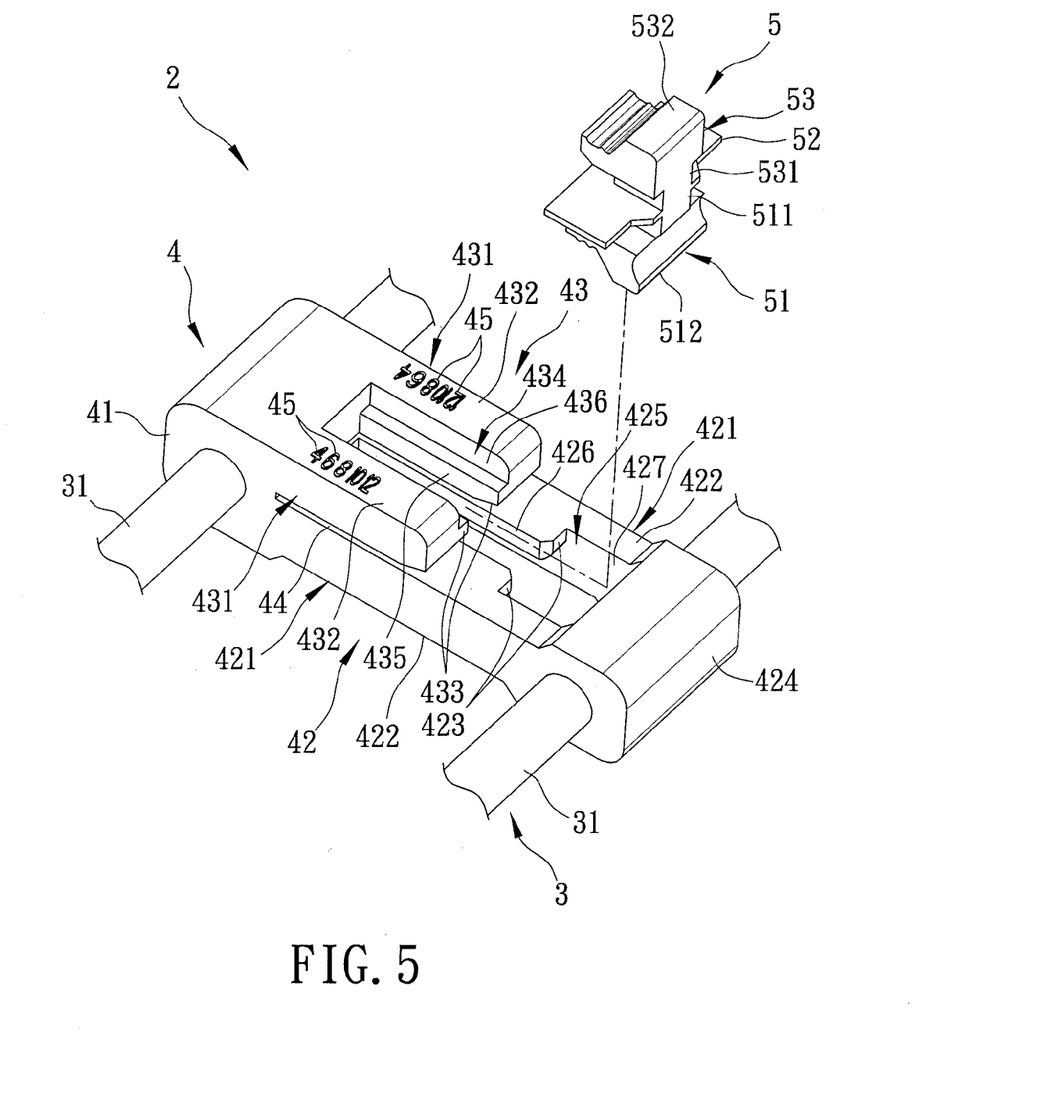
FIG. 5 is a partly exploded perspective view of an organizing device according to the second preferred embodiment of the present invention.
Figure 6:
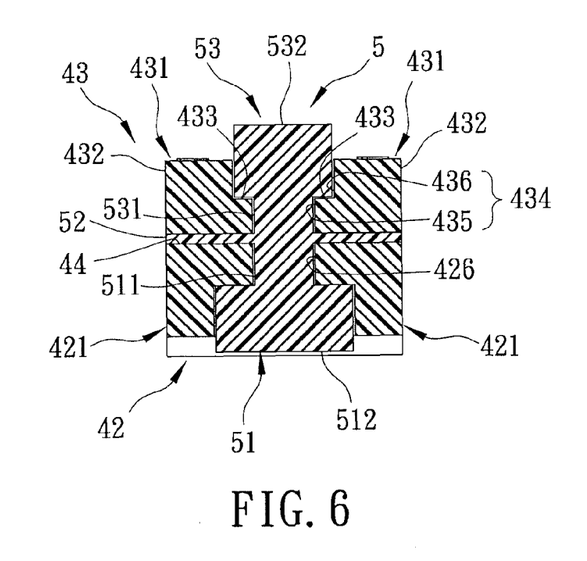
FIG. 6 is a cross sectional view illustrating the relationship between a positioning unit and a limiting unit in the second preferred embodiment of the present invention.

Referring to FIGS. 5 and 6, the second preferred embodiment of the organizing device 2 for organizing multiple optical fiber lines in the present invention is similar to the first preferred embodiment, with differences being: the organizing device 2 of the second embodiment further includes a limiting unit 5 movable in the positioning slot 44. The positioning unit 4 further includes indicia 45 formed on the second positioning parts 43 to indicate the total number of the optical fiber lines 200.

The first positioning part 42 includes a pair of the first positioning arms 421 that are spaced apart from each other and that extend from the main body 41, a connecting portion 424 that interconnects distal ends of the first positioning arms 421 distal from the main body 41, and a first slide slot 425 cooperately defined by the main body 41, the first positioning arms 421 and the connecting portion 424.

Each first positioning arm 421 includes an outer arm segment 422 connected to the main body 41 at one end and to the connecting portion 424 at the other end, and an extending segment 423 that extends from the outer arm segment 422 towards the other one of the first positioning arms 421. The extending segments 423 of the first positioning arms 421 configure the first slide slot 425 into a first guiding section 426 between the extending segments 423, and a placement section 427 disposed between the connecting portion 424 and distal ends of the extending segments 423 that are distal from the main body 41. The placement section 427 is in spatial communication with the first guiding section 426.

The second positioning part 43 includes a pair of the second positioning arms 431 that are spaced apart from each other and that extend from the main body 41 in the same direction as the first positioning arms 421 of the first positioning part 42, and a second slide slot 434 cooperatively defined by the pair of second positioning arms 431. Each of the second positioning arms 431 includes a suspension arm segment 432 and a protruding segment 433 that extends from the suspension arm segment 432 toward the other one of the second positioning arms 431. The protruding segments 433 configure the second slide slot 434 into a second guiding section 435 that faces toward the first positioning part 42, and a slide section 436 that is opposite to the second guiding section 435 and that is in spatial communication with the second guiding section 435. The indicia 45 are formed on the side of the suspension arm segments 432 opposite to the first positioning part 42.

The limiting unit 5 includes a first slide part 51 movable in the first slide slot 425, a limiting plate 52 connected to the first slide part 51 and slidable in the positioning slot 44, and a second slide part 53 connected to the limiting plate 52 and movable in the second slide slot 434.

The first slide part 51 includes a first neck portion 511 connected to the limiting plate 52 and movable in the first guiding section 426, and a first drive portion 512 connected to one end of the first neck portion 511 that is opposite to the limiting plate 52. The second slide part 53 includes a second neck portion 531 connected to the limiting plate 52 and movable in the second guiding section 435, and a second drive portion 532 connected to one end of the second neck portion 531 that is opposite to the limiting plate 52. The second drive portion 532 is movable in the slide section 436.

Figure 7:
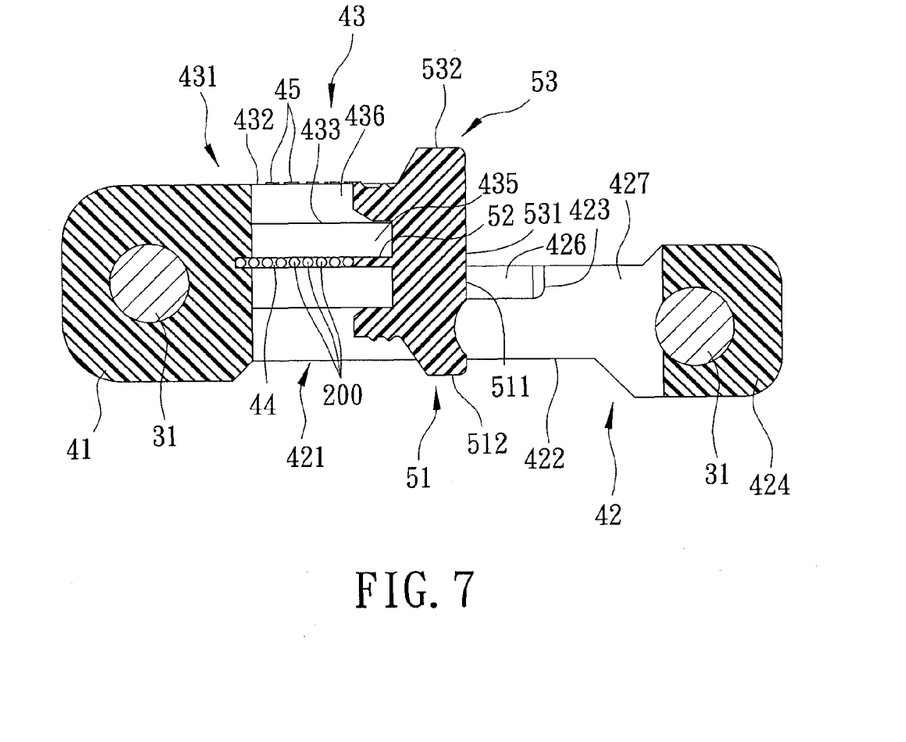
FIG. 7 is another cross sectional view of the second preferred embodiment of the organizing device in the use state.

Referring to FIGS. 5 and 7, in an actual application, the first drive portion 512 of the first slide part 51 is inserted through the placement section 427 to enable the first neck portion 511 and the second neck portion 531 to move within the first guiding section 426 and the second guiding section 435, respectively. After which, the operator can move the first slide part 51 and the second slide part 53 to adjust the position of the limiting plate 52 to abut against the optical fiber lines 200 in the positioning slot 44, as illustrated in FIG. 7.

The first positioning part 42, the second positioning part 43, the main body 41 and the limiting plate 52 cooperate to provide a better tightening effect on the optical fiber lines 200.

At the same time, the total number of the optical fiber lines 200 can be verified from the indicia 45. The first drive portion 512 of the first slide part 51 and the second drive portion 532 of the second slide part 53 enable the operator to apply force to adjust the limiting plate 52 conveniently.

Figure 8:
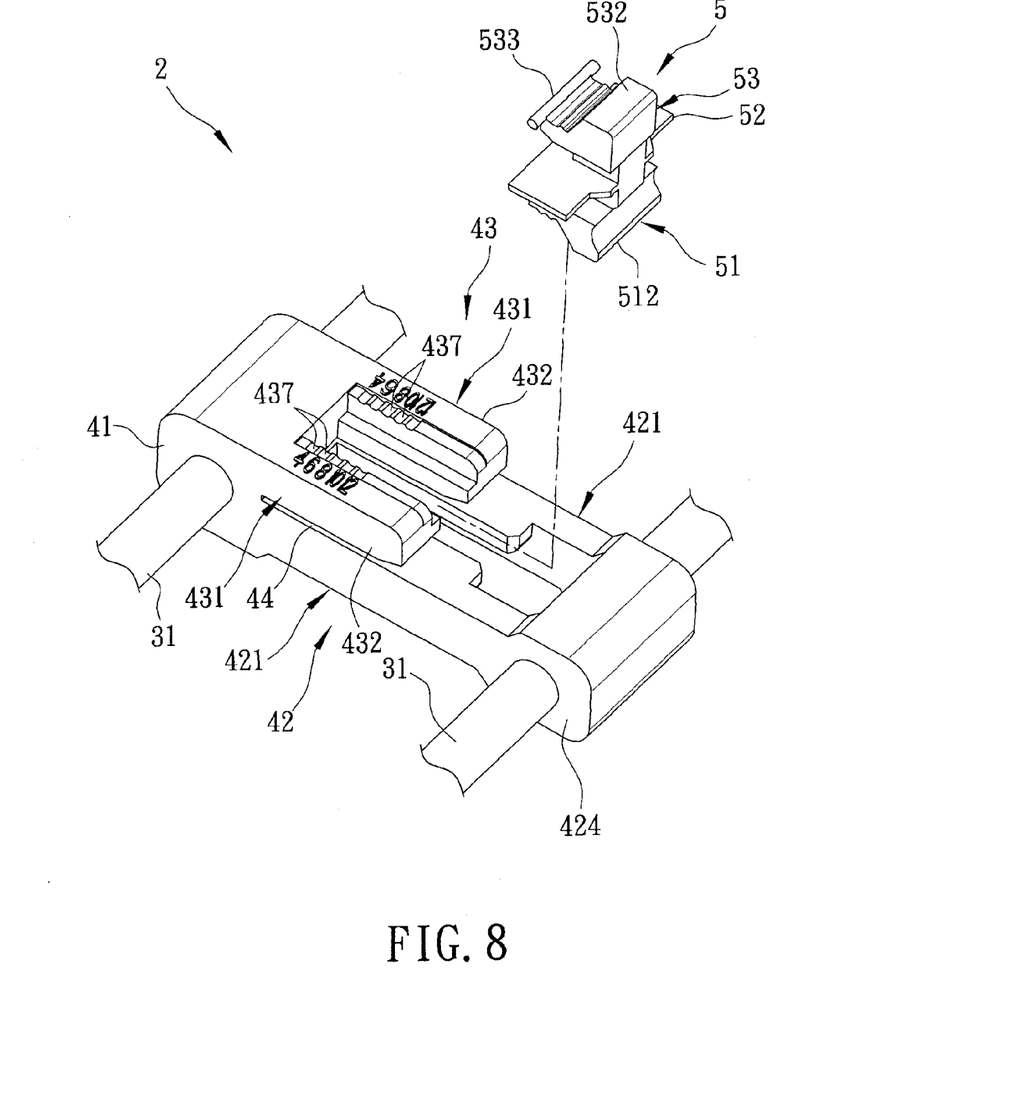
FIG. 8 is a partly exploded perspective view of the third preferred embodiment of the organizing device according to the present invention.
Figure 9:
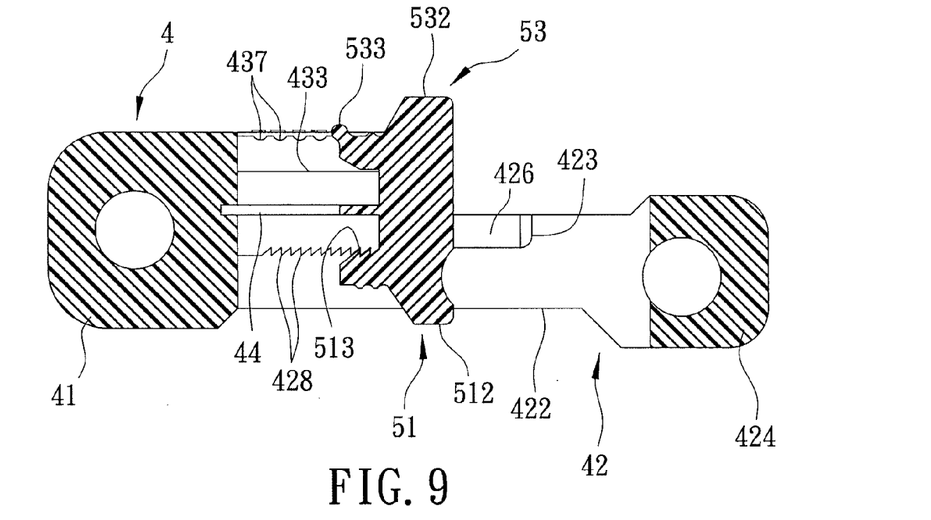
FIG. 9 is a cross sectional view of the third preferred embodiment of the organizing device.

Referring to FIGS. 8 and 9, the third preferred embodiment of the organizing device 2 for organizing multiple optical fiber lines in the present invention is similar to the second preferred embodiment, with differences being: the first positioning part 42 further includes a plurality of first positioning portions 428 formed along at least one of the first positioning arms 421, a plurality of second positioning portions 437 being formed along at least one of the second positioning arms 431, a first engaging portion 513 of the first slide part 51 to selectively engage the first positioning portions 428, and a second engaging portion 533 of the second slide part 53 to selectively engage the second positioning portions 437.

In this preferred embodiment, the first positioning portions 428 of the first positioning part 42 are teeth formed on the extending segment 423, and the first engaging portion 513 of the first slide part 51 has at least one tooth formed on the first drive portion 512 to engage the first positioning portions 428. The second positioning portions 437 of the second positioning part 43 are grooves formed in the suspension arm segment 432, and the second engaging portion 533 of the second slide part 53 is a positioning rod formed on the second drive portion 532 to engage the second positioning portions 437.

Through the cooperation between the first positioning portions 428 and the first engaging portion 513 and the cooperation between the second positioning portions 437 and the second engaging portion 533, the limiting unit 5 can be moved and be positioned at a particular position. Such positioning prevents any accidental shifting of the limiting unit 5 by external forces and provides more stability as compared to the second preferred embodiment.

Figure 10:
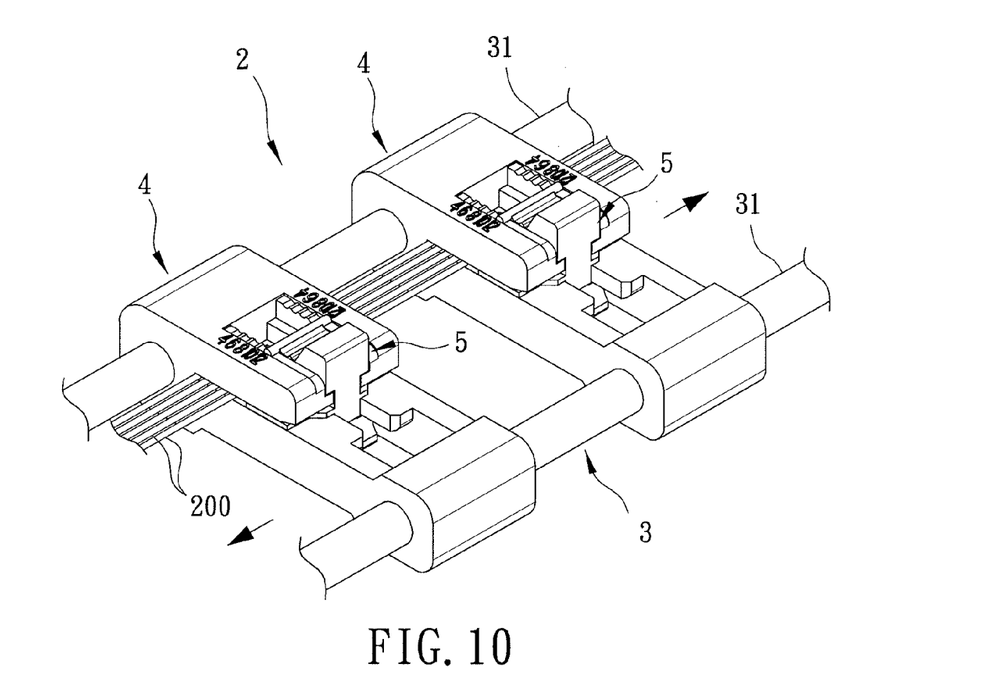
FIG. 10 is a perspective view of the fourth preferred embodiment of the organizing device according to the present invention.

Referring to FIG. 10, the fourth preferred embodiment of the organizing device 2 for organizing multiple optical fiber lines in the present invention is similar to the third preferred embodiment, with differences being: the organizing device 2 includes two positioning units 4 movably disposed on a guiding unit 3, and two limiting units 5 respectively disposed in the two positioning units 4.

The fourth embodiment, apart from achieving the effects similar to the third embodiment, provides two positioning units 4 that can be pulled in opposite directions for arranging the plurality of the optical fiber lines 200 to run parallel to each other on a plane along the guide components 31.

In summary, since the dimensions of the positioning slot 44 match the diameter of the optical fiber lines 200, the optical fiber lines 200 can be placed in the positioning slot 44 with speed and accuracy. Also, damage due to external forces and misplacement of the optical fiber lines 200 in the positioning slot 44 by an operator can be effectively prevented.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An organizing device for organizing multiple optical fiber lines to run parallel to each other on a plane, said organizing device comprising:
 a guiding unit;
 a positioning unit including;
 a main body slidably disposed on said guiding unit, a first positioning part extending from said main body, and
a second positioning part that extends from said main body in a same direction as said first positioning part, and that is spaced apart from said first positioning part,
wherein said main body, said first positioning part and said second positioning part cooperate to define a positioning slot; and
a limiting unit movable in said positioning slot,
wherein a distance between said first and second positioning parts corresponds to a diameter of tile optical fiber lines, and
wherein one of said first and second positioning parts comprises an outer surface formed with indicia to indicate a number of the optical fiber lines.

2. The organizing device as claimed in claim 1, wherein:
said first positioning part includes a pair of first positioning arms that are spaced apart from each other and that extend from said main body, and a connecting portion that interconnects distal ends of said first positioning arms distal from said main body;
said main body, said first positioning arms and said connecting portion cooperate to define a first slide slot;
said second positioning part includes a pair of second positioning arms that are spaced apart from each other, that extend from said main body in the same direction as said first positioning arms of said first positioning part, and that cooperate to define a second slide slot; and
said limiting unit includes a first slide part movable in said first slide slot, a limiting plate connected to said first slide part and movable in said positioning slot, and a second slide part connected to said limiting plate and movable in said second slide slot.

3. The organizing device as claimed in claim 2, wherein said indicia are provided on at least one of said second positioning arms.

4. The organizing device as claimed in claim 2, wherein said first positioning part further includes a plurality of first positioning portions formed along at least one of said first positioning arms, said second positioning part further includes a plurality of second positioning portions formed along at least one of said second positioning arms, said first slide part of said limiting unit has a first engaging portion to selectively engage said first positioning portions, and said second slide part of said limiting unit has a second engaging portion to selectively engage said second positioning portions.

5. The organizing device as claimed in claim 4, wherein each of said first positioning arms has an outer arm segment and an extending segment that extends from said outer arm segment toward the other one of said first positioning arms, said extending segments of said first positioning arms configuring said first slide slot with a first guiding section between said extending segments, and a placement section disposed between said connecting portion and distal ends of said extending segments that are distal from said main body, said placement section being in spatial communication with said first guiding section, said first slide part of said limiting unit having a first neck portion connected to said limiting plate and movable in said first guiding section, and a first drive portion connected to one end of said first neck portion that is opposite to said limiting plate, said first positioning portions being formed on one side of at least one of said extending segments that faces away from said positioning slot, said first engaging portion of said first slide part of said limiting unit being formed on said first drive portion.

6. The organizing device as claimed in claim 5, wherein said first positioning portions are teeth formed on at least one of said extending segments, and said first engaging portion is a tooth formed on said first drive portion.

7. The organizing device as claimed in claim 4, wherein each of said second positioning arms has a suspension arm segment and a protruding segment that extends from said suspension arm segment toward the other one of said second positioning arms, said protruding segments of said second positioning arms configuring said second slide slot with a second guiding section that faces toward said first positioning part, and a slide section that is opposite to said second guiding section and that is in spatial communication with said second guiding section, said second slide part of said limiting unit having a second neck portion connected to said limiting plate and movable in said second guiding section, and a second drive portion connected to one end of said second neck portion that is opposite to said limiting plate, said second drive portion being movable in said slide section, said second positioning portions being formed on one side of at least one of said suspension arm segments that faces away from said positioning slot, said second engaging portion of said second slide part of said limiting unit being formed on said second drive portion.

8. The organizing device as claimed in claim 7, wherein said indicia are provided on one side of at least one of said suspension arm segments that faces away from said first positioning part.

9. The organizing device as claimed in claim 7, wherein said second positioning portions are grooves formed in at least one of said suspension arm segments, and said second engaging portion is a positioning rod formed on said second drive portion.

10. The organizing device as claimed in claim 2, wherein said guiding unit includes a pair of guide components, each of which extending through a respective one of said main body and said connecting portion of said first connecting part.

* * * * *